US006910836B2

(12) United States Patent
Peterson

(10) Patent No.: US 6,910,836 B2
(45) Date of Patent: Jun. 28, 2005

(54) IMPACT DRIVER FOR ROTARY TOOLS

(75) Inventor: Francis C. Peterson, Spooner, WI (US)

(73) Assignee: Nesson Enterprises, River Forest, IL (US)

( * ) Notice: Subject to any disclaimer, the term of this patent is extended or adjusted under 35 U.S.C. 154(b) by 118 days.

(21) Appl. No.: 10/397,656

(22) Filed: Mar. 26, 2003

(65) Prior Publication Data

US 2003/0202850 A1 Oct. 30, 2003

Related U.S. Application Data

(63) Continuation-in-part of application No. 10/134,865, filed on Apr. 29, 2002, now abandoned.

(51) Int. Cl.$^7$ .............................................. B23B 47/04
(52) U.S. Cl. ............................. 408/9; 81/463; 173/93.5; 173/109; 173/213; 192/56.62; 192/55.1; 408/17; 408/139
(58) Field of Search .............................. 408/9, 17, 139, 408/124; 173/93, 93.5, 94, 104, 109, 213; 192/56.62, 55.1, 56.1, 56.6, 56.61; 81/463, 466, 473; 470/207, 198

(56) References Cited

U.S. PATENT DOCUMENTS

| 578,485 | A | | 3/1897 | Errington |
| 2,564,666 | A | * | 8/1951 | Beacom ...................... 408/139 |
| 2,684,491 | A | * | 7/1954 | Roddick ..................... 408/139 |
| 2,791,433 | A | | 5/1957 | Dodd |
| 2,909,047 | A | | 10/1959 | Waltersheid-Müller et al. |
| 3,002,206 | A | * | 10/1961 | Johnson ...................... 408/139 |
| 3,080,029 | A | | 3/1963 | Stober |
| 3,185,275 | A | | 5/1965 | Orwin |
| 3,303,522 | A | * | 2/1967 | Kumabe et al. .............. 408/17 |
| 3,649,129 | A | * | 3/1972 | King, Jr. ..................... 408/139 |
| 3,835,973 | A | | 9/1974 | Braggins et al. |
| 4,226,316 | A | | 10/1980 | Geisthoff |
| 4,263,996 | A | | 4/1981 | Putney |
| 4,386,689 | A | * | 6/1983 | Kato ........................... 464/36 |
| 4,417,650 | A | | 11/1983 | Geisthoff |
| 4,514,115 | A | * | 4/1985 | Akashi ........................ 408/139 |
| 4,566,570 | A | | 1/1986 | Geisthoff |
| 4,593,800 | A | | 6/1986 | Ness et al. |
| 4,655,661 | A | * | 4/1987 | Brandt ...................... 411/387.1 |
| 4,693,654 | A | * | 9/1987 | Bettini ...................... 411/387.4 |
| 5,858,231 | A | | 1/1999 | Kämpf |
| 6,402,448 | B1 | * | 6/2002 | Dicke ....................... 411/387.5 |

FOREIGN PATENT DOCUMENTS

| JP | 178107 | * | 8/1986 | .................. 408/17 |
| JP | 140702 | * | 6/1987 | .................. 408/17 |
| JP | 292306 | * | 12/1987 | .................. 408/17 |
| JP | 300806 | * | 12/1988 | .................. 408/17 |
| SU | 784999 | * | 12/1980 | .................. 408/17 |
| SU | 798285 | * | 1/1981 | .................. 408/17 |

* cited by examiner

Primary Examiner—Daniel W. Howell
(74) Attorney, Agent, or Firm—Fitch, Even, Tabin & Flannery

(57) ABSTRACT

Method and apparatus for improving the efficiency of the rotating cutter of a tool by converting at least part of the rotational torque applied to the cutter to repeated rotational impact forces.

3 Claims, 2 Drawing Sheets

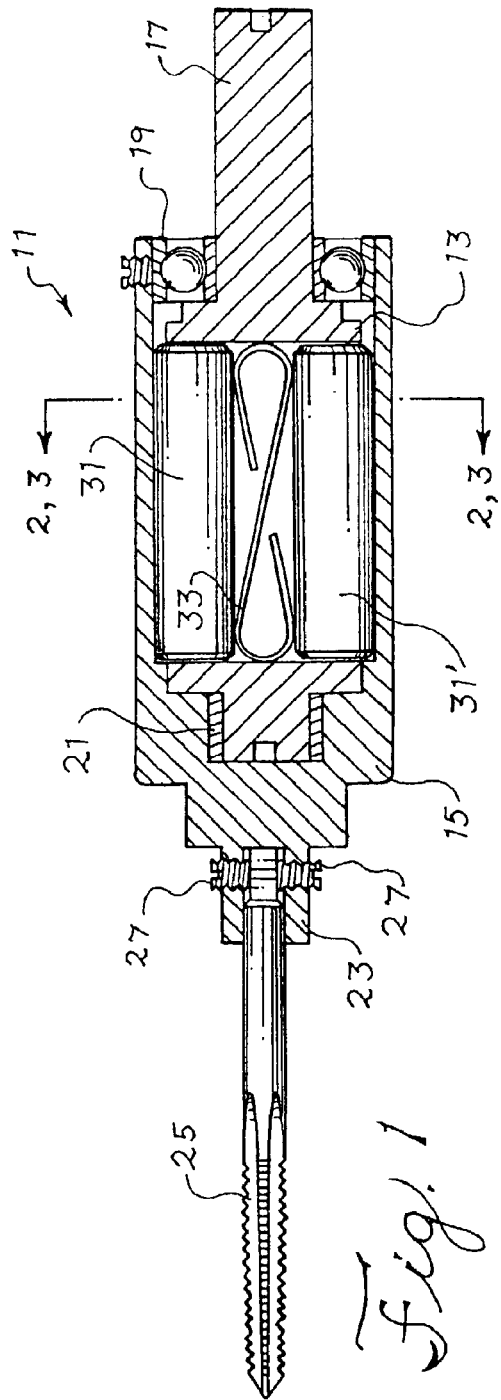
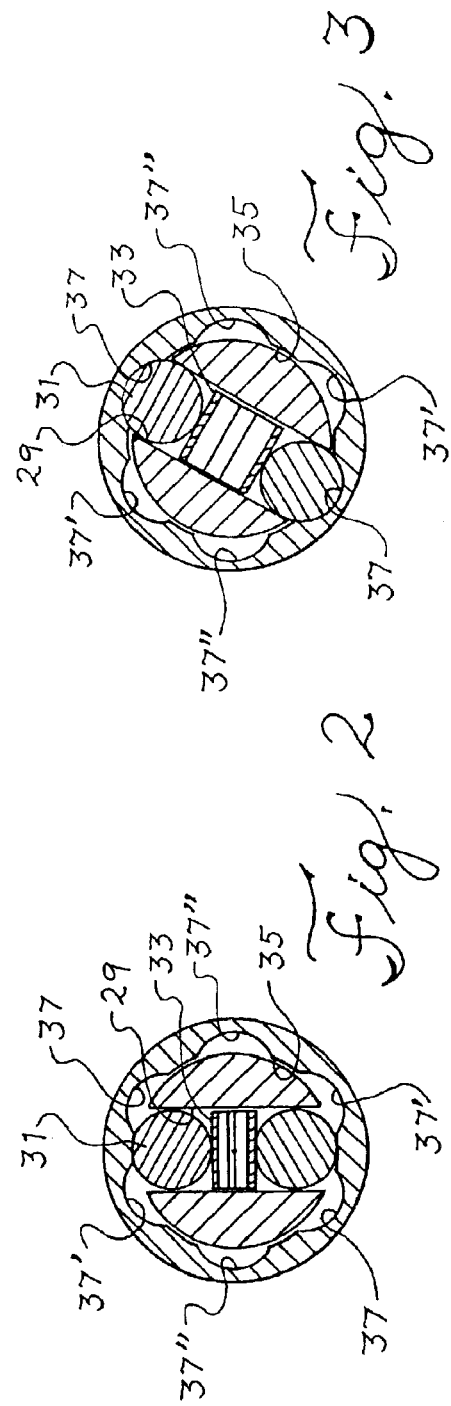

IMPACT DRIVER FOR ROTARY TOOLS

CROSS REFERENCE TO RELATED APPLICATIONS

This application is a continuation-in-part of my U.S. patent application Ser. No. 10/134,865, filed Apr. 29, 2002 now abandoned, which is incorporated herein by reference in its entirety.

FIELD OF THE INVENTION

The present invention relates generally to a driver for a rotary tool. More particularly, it relates to a driver for a rotary tool which imparts repeated rotational impact forces to the tool.

BACKGROUND OF THE INVENTION

Various tools have rotating cutters which modify the shape of a work piece. An example of such a tool is a tapper which cuts the bore of a work piece to provide internal threads. Another example is a milling machine, in which a rotating cutter removes metal from the surface of a work piece to provide a desired shape.

In such tools, the cutter material is harder than the work piece in order to effect cutting of the latter. As a general rule, the harder the cutter material is, the more brittle is the cutter, and the cutter becomes prone to fracture. The problem can be alleviated by hardening only the outer surface of the cutter leaving a core which is softer but tougher. However, it is difficult to harden only the cutting surface in small diameter taps. Moreover, the cutter is prone to fracture if too much work piece material is sought to be removed in a single pass, no matter how hard or soft the work piece material is.

Taps employed to cut internal threads in a work piece are particularly vulnerable to breakage, for a variety of reasons. If, for example, the bore in the work piece is slightly undersized, torsional stress is increased, frequently resulting in a broken tap. The machine must be shut down, the broken tap removed, and a new one inserted before operations can resume. Oftentimes, multiple tapping heads are used at a single station in high speed production lines, increasing the frequency of tap breakage.

Self-tapping screws for insertion in metallic or non-metallic work pieces, such as concrete, have much the same properties as taps for cutting threads in metallic work pieces. They are hard and brittle, and easily broken.

SUMMARY OF THE INVENTION

It is a principal object of the present invention to provide a method and apparatus for improving the efficiency of tools having a rotating cutter. It is a more particular object of the present invention to provide a method and apparatus for improving the efficiency of rotating cutting tools by imparting repeated rotational impact forces to the cutter. Yet another object of the present invention is to provide a method and apparatus for improving the efficiency of a taps and self-tapping screws by imparting repeated rotational impact forces to the tap or self-tapping screw.

In accordance with the present invention, these and other objects are achieved by the provision of a driver for a rotating cutter through which the torque applied to the cutter is converted from a constant torque to an intermittent torque, thereby imparting repeated rotational impact forces to the cutter. Although the teachings of the present invention may well find application in various rotary tools, they are particularly applicable to taps and self-tapping screws.

BRIEF DESCRIPTION OF THE DRAWINGS

The above and other objects of the present invention will be apparent upon consideration of the ensuing detailed description, taken in conjunction with the accompanying drawing, in which:

FIG. 1 is a cross-sectional view of a driver constructed in accordance with the present invention in which the driver is disengaged;

FIG. 2 is a cross-sectional view of the driver of FIG. 1 taken along lines 2—2;

FIG. 3 is a cross-sectional view of the driver of FIG. 1 in which the driver is engaged.

DETAILED DESCRIPTION OF THE PREFERRED EMBODIMENTS

Figure 4:
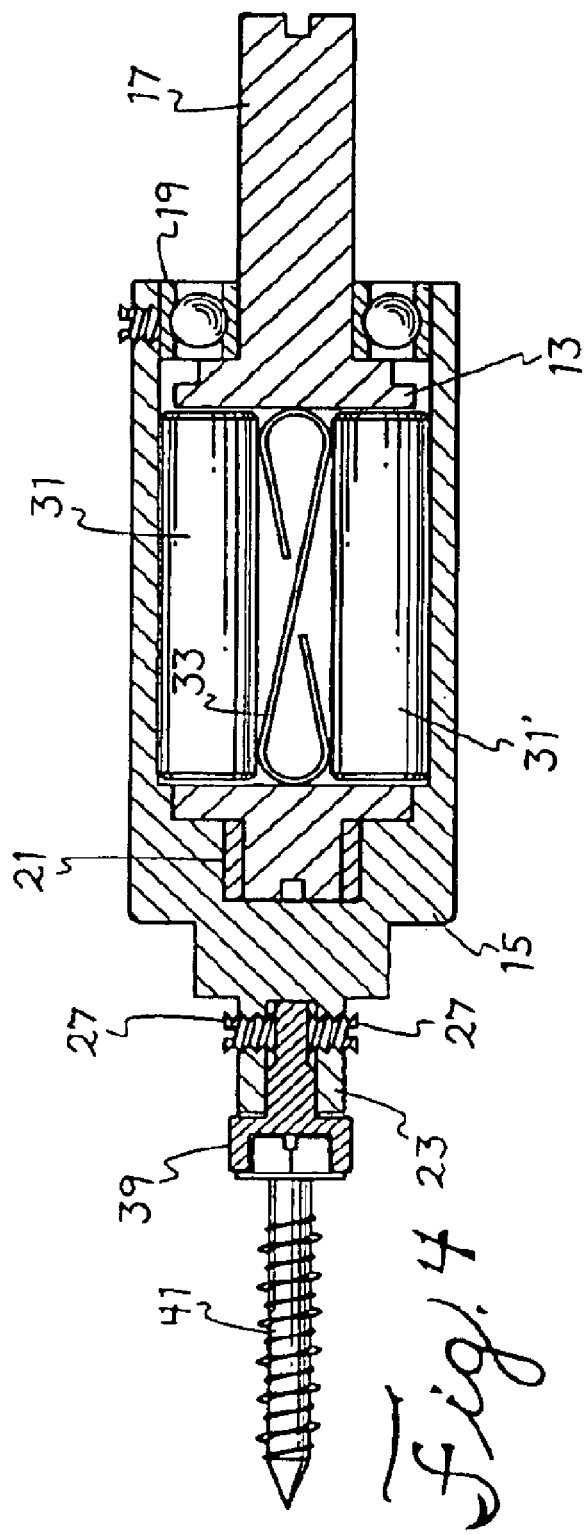
FIG. 4 is a cross-sectional view of the driver of FIG. 1 in which the rotating cutter is a self-tapping concrete screw.

FIG. 4 shows the driver chuck 23 receiving a hexagonal socket 39 mating with the head of a self-tapping concrete screw 41.

As shown in FIG. 1, there is provided a driver 11 comprising a driver rotor 13 and a driver cup 15. The driver rotor 13 includes a driver shank 17, adapted to be rotatably driven as by an electric, pneumatic or hydraulic motor (not illustrated).

The driver rotor 13 is rotatably supported within the driver cup 15 by an inboard bearing 19 and an outboard bearing 21.

Integral with the driver cup 15 is a chuck 23 in which a tap 25 is secured by one or more set screws 27.

As best shown in FIG. 2, a longitudinal slot 29 is formed in the driver rotor 13 extending diametrically therethrough, in which are disposed rollers 31 and 31', separated by a spring 33. The spring 33 biases the rollers 31, 31' against the inner wall 35 of the driver cup 15.

A plurality of arcuately curved recesses 37, 37' and 37" are formed at regular intervals around the circumference of the inner wall 35 of the driver cup 15, formed so as to mate with the rollers 31, 31'.

In FIGS. 1 and 2, the driver rotor 13 is shown out of engagement with the driver cup 15, the rollers 31, 31' not being received in the recesses 37, 37' or 37". In operation, when the driver 11 is rotated by the shank 17 against the resistance of the tap 25 within a bore to be threaded, the driver rotor 13 advances to an engaged position, as shown in FIG. 3, wherein the rollers 31, 31' are received in the recesses 37, 37' or 37", causing the tap to rotate and begin its advance into the bore.

At a preselected torque determined by the constant of the spring 33, the rollers 31, 31' climb out of the recesses in which they are initially received, and the driver rotor 13 slips within the driver cup 15 until the rollers 31, 31' drop into the succeeding recesses 37, 37' or 37". It will be understood that the rollers 31, 31' rotate freely within the slot 29 and against the spring 33, hindered only by frictional resistance.

Once the preselected torque is reached and the driver rotor 13 slips circumferentially within the driver cup 15, the torque applied to the driver shank 17 is converted into an intermittent torque, exerting repeated rotational impact forces on the tap 25.

It has been found that the repeated rotational impact torque forces exerted on the tap 25 or screw 41 provide a surprisingly improved effectiveness in cutting, i.e., threading, the bore of the work piece. Moreover, in accordance with the present invention the life of the tap is substantially improved, inasmuch as the torsional stress exerted on the tap is limited by the torque which can be applied to the tap before the rotor slips within the cup.

It is well known that an impact wrench enables a nut to be tightened to a greater extent than is possible with the application of constant torque and, similarly, that loosening a nut is accomplished much more effectively with an impact wrench than if a constant torque is applied. It is not believed, however, that the advantages of rotational impact have been utilized to a significant extent in tools of the type described herein.

An important feature of the present invention is the provision of impact forces which are exclusively rotational forces. Substantially no longitudinal impact forces are transmitted to the cutter.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed:

1. A driver for a tool having a rotating cutter, comprising, in combination:

a hollow cylindrical cup and a cylindrical rotor received therein, said cup including a chuck for driving a cutter, said rotor including a rotatably driven shank, said rotor having a longitudinal slot formed therein extending diametrically therethrough, longitudinal rollers and spring means received in said slot so that said rollers are biased outwardly from the circumference of said rotor, said cup having a plurality of longitudinal recesses formed circumferentially around the inner surface thereof, said recesses being configured to receive said rollers in mating relationship, the biasing force of said spring thereby providing a limit on the torque transmissible from said rotor to said cup and imparting repeated rotational impact forces to the cutter when said limit is exceeded.

2. The driver of claim 1 in which the cutter comprises a rotating tap for cutting threads in a bore.

3. The driver of claim 1 in which the cutter comprises a self-tapping screw.

* * * * *